Sept. 3, 1957   J. H. DEVINE   2,804,796
MULTI-PART BOLT HAVING RESILIENT MEANS PROVIDING A STOP SHOULDER
Filed July 6, 1954   2 Sheets-Sheet 2
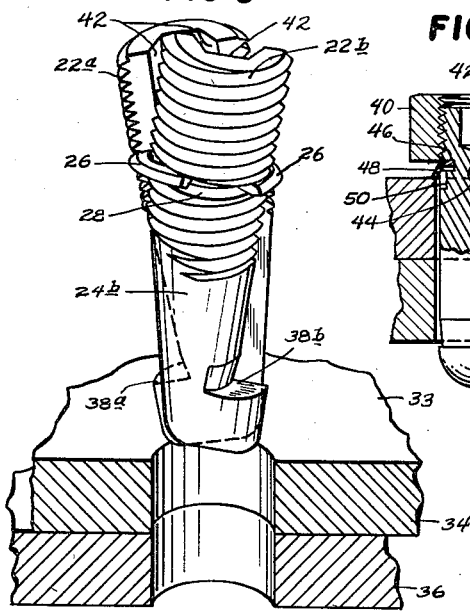
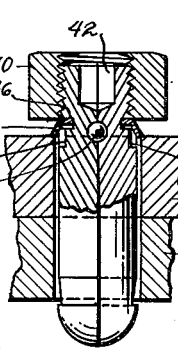
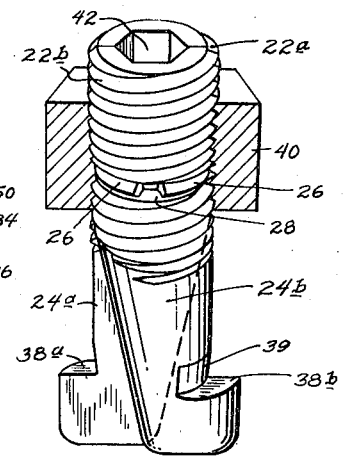
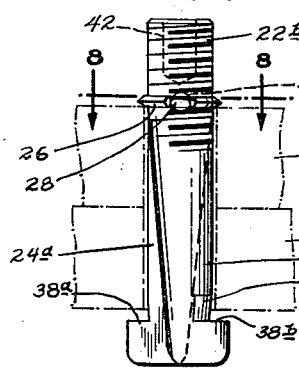
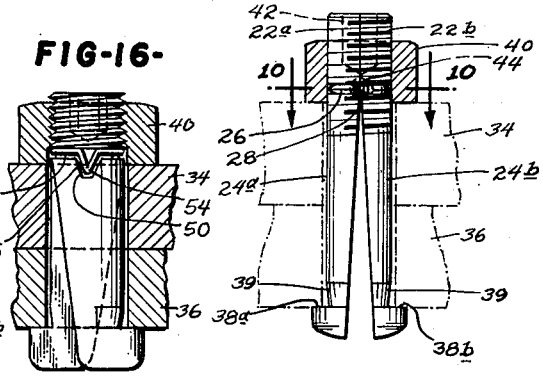
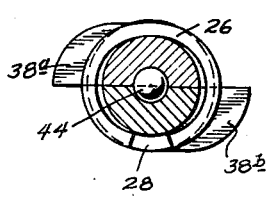
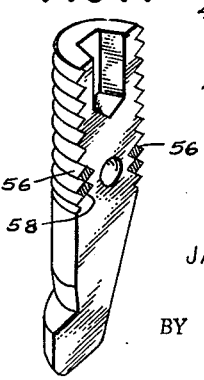
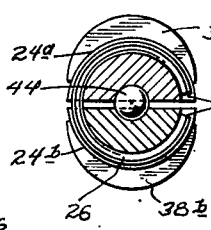
INVENTOR
JAMES HENRY DEVINE
BY
ATTORNEY United States Patent Office 2,804,796
Patented Sept. 3, 1957

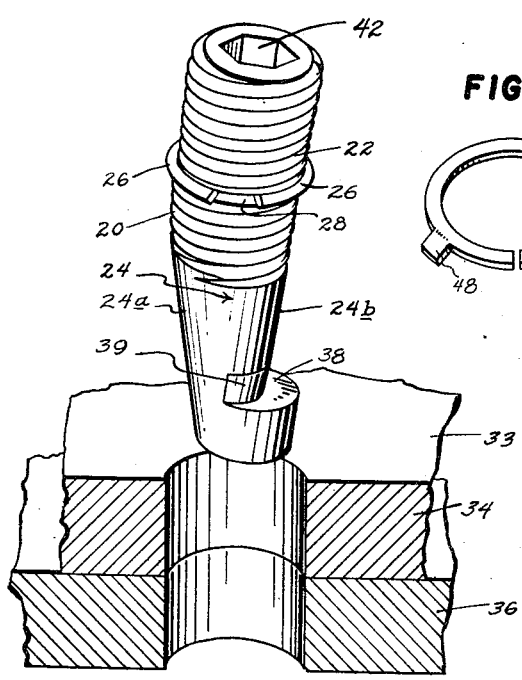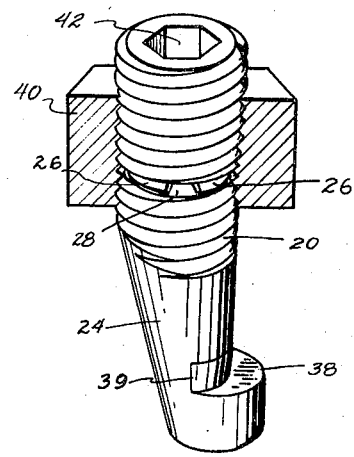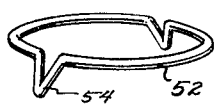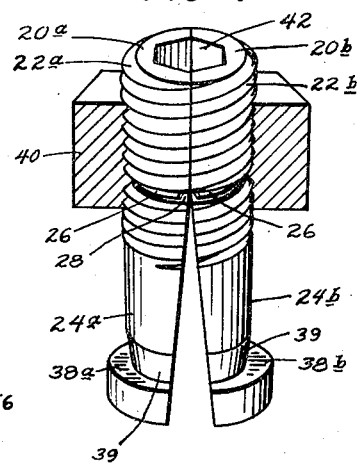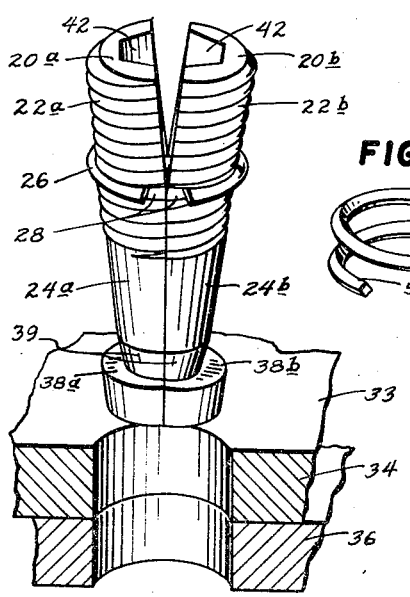

2,804,796

MULTI-PART BOLT HAVING RESILIENT MEANS PROVIDING A STOP SHOULDER

James H. Devine, Washington, D. C.

Application July 6, 1954, Serial No. 441,214

6 Claims. (Cl. 85—1)

This invention relates generally to bolts, and more particularly to blind bolts, that is, bolts that are used to secure, hold, or lock one material to another when access is not had to one of the bolt contacting-faces of the materials, as the back surface of a wall, referred to hereinafter as a "blind surface."

The present invention is an improvement on the inventions disclosed and claimed in my co-pending application, Serial No. 241,029, filed August 9, 1951, and now abandoned, and in my co-pending application, Serial No. 315,702, filed October 20, 1952.

The bolts described in the first of the cited applications are of three types: a "solid bolt," a "slide bolt," and a "spread bolt," the solid bolt being made from a single piece of material, the slide bolt of two counterparts, and the spread bolt of two or more counterparts pivoted one on the other to form a unit bolt. In the slide bolt, flat surfaces of the shanks slide one on the other as the bolt parts pivot on each other to move from a "collapsed condition" (for insertion into holes) to the "expanded condition" (for engaging the blind surface) to lock the materials together. In the spread bolt, the flat surfaces of the shanks spread apart from each other as the parts pivot on each other to move from the collapsed to the expanded condition. Each of the three types of bolts has the common construction characteristic of having at least one member consisting of a tension-producing or threaded portion, defined hereinafter as the "end" of the bolt, and a tapered shank extending axially therefrom, which shank has a flat surface or "toe" extending laterally from the shank to engage a blind surface. In each of the types of these bolts in my prior inventions, the end of the bolt is larger in diameter than the shank, whereby an overhanging ledge is formed in the plane common to the end and to the shank. This ledge engages an "exposed" surface of one of the plates or materials to be fastened together to prevent the bolt, before a nut is screwed thereon, from passing through the holes in said materials. The ledge also forms a pivot on which the parts of the bolt move from the collapsed condition to the expanded condition. The pivot of the bolt, whether it be only the ledge of the solid bolt or the ledge and a pin or ball of the slide or spread bolt, is in the plane common to the threaded end and the shank, which plane is defined hereinafter as the "pivot plane."

The bolts disclosed in the second of the cited applications relate to the slide and spread types of pivot-locking bolts, and more particularly to the constructions and arrangements to hold the two counterparts together when they are being assembled, shipped, stored, used, or re-used. In each of the bolts the threaded end of the bolt is larger in diameter than the shank.

It has been found in practice to be inconvenient at times to have bolts that require nuts of a diameter different from the diameter of the holes to be drilled in the materials to be secured together. It has, likewise, been found inconvenient to have on hand bolts of one diameter that require nuts of another diameter. Also, as the strength of a bolt is the strength at its weakest portion, the bolt is no stronger than its shank section and, therefore, the material of which the bolt is made is wasted when the end of the bolt is of a greater diameter than the shank. It has also been found to be more convenient as a manufacturing procedure to make the threaded end and the shank of the bolt of the same diameter, especially in the step in manufacturing of forming the threads on the end of the bolt. Also, a wider use of an individual bolt may be had if the threads extend a distance down the shank from the pivot plane of the bolt, as the nut will then engage the threads on the shank and provide ample engagement between the nut and the bolt even when the bolt has been drawn upward a considerable distance above the exposed surface before the flat toes on the shank begin to engage the blind surface. An individual bolt may, therefore, be used over a wider range of thickness of materials to be secured together.

The bolts of the present invention relate to the three types of bolts disclosed and claimed in the two cited filed applications, and differ therefrom in that (1) the diameters of the threaded ends and of the adjoining portion of the tapered shank are equal, (2) the ledge on which the solid bolt, or the counterparts of the slide or spread bolts pivots, consists of a resilient ring held in a recess in the bolt, substantially in the pivot plane, and (3) the shank is threaded for a distance below the pivot plane of the bolt. Parts of the resilient ring extend in its unrestrained condition beyond the major or outside diameter of the threads of the bolt and the ring is capable of being contracted fully into the recess, so that its outer diameter in its contracted condition is less than the root or minor diameter of the thread of the bolt, thus permitting a nut, when screwed down beyond the threaded end, to force the ring fully within the recess, pass over and engage the threads on the shank.

It is evident that the ring has three functions: (1) to engage the exposed surface to prevent the bolt from passing through the blind holes; (2) to form a pivot point or surface on which the solid bolt or the counterparts of the spread or slide bolts may swing; and (3) to keep the counterparts together. It is, of course, apparent that if the recess and ring are positioned slightly above the pivot plane, the ring will tend to keep the counterparts in their expanded condition, and if the recess and ring are positioned slightly below the pivot plane, the ring will tend to keep the counterparts in their collapsed condition.

The principal object of the present invention is to provide a blind bolt having a blind-surface engaging toe on its shank and stop means in the form of a resilient ring to prevent the bolt, in the unrestrained condition of the ring, from passing through holes in the materials to be secured together, the ring to be contractile within a recess in the bolt to permit a nut moving along the threaded end to force the ring fully into the recess and pass over the ring as the nut engages threads on the shank.

Another object of the invention is to provide a blind bolt having a threaded end, a tapered and partially threaded shank extending therefrom, and an expansible and contractile ring in the plane common to the end and shank.

Another object of the invention is to provide a bolt having the upper end of its tapered shank of the same diameter as its threaded end and having contractile protuberances extending from said bolt in the plane common to said end and said shank.

Another object of the invention is to provide a bolt that is easier to manufacture and is more economical in materials used than has been experienced heretofore.

Other objects of the invention will be apparent from the description of the invention as hereinafter set forth in detail and from the drawings made a part thereof, in which:

Figure 1 is a view in perspective of a solid bolt in a "collapsed" condition positioned above and at an angle to the axis of holes in two plates and ready for insertion into the holes, showing a flexible ring in the pivot plane and threads extending on the shank below the said plane;

Figure 2 is a view in perspective of the solid bolt of Figure 1 showing a nut screwed on the threaded end of the bolt, over the said ring and partially down the threads of the shank;

Figure 3 is a view in perspective of a spread bolt in its collapsed condition and positioned to be inserted into the holes of two plates;

Figure 4 is a view in perspective of the spread bolt of Figure 3 in an expanded condition, with a nut screwed thereon;

Figure 5 is a view in perspective of a slide bolt in its collapsed condition and ready to be inserted into holes in two plates;

Figure 6 is a view in perspective of the bolt shown in Figure 5 in an expanded condition with a nut screwed thereon;

Figure 7 is a side elevation view of a slide bolt inserted in holes in plates (in broken lines) to be locked together and before a tensioning nut is applied to the bolt;

Figure 8 is an enlarged cross section view of the bolt of Figure 7 taken on line 8—8 of Figure 7;

Figure 9 is a side elevation view of a spread bolt inserted in holes in plates (in broken lines) with a tension nut in place and the bolt under tension;

Figure 10 is an enlarged cross section view of the bolt in Figure 9 taken on line 10—10 of Figure 9;

Figure 11 is a view in perspective of a ring with flexible tabs, as a substitute for the rings shown in Figures 1 to 10;

Figure 12 is a view in perspective of a ring made of wire, with resilient bent sections extending therefrom, as a substitute for rings shown in Figures 1 to 10;

Figure 13 is a view in perspective of a resilient ring in the form of a spiral;

Figure 14 is a view in perspective of one of the counterparts of a slide bolt, showing the recess in the pivot plane of the counterpart into which the resilient ring may be forced and a ring in its restrained position;

Figure 15 is a side view, partly in cross section, of a slide bolt, showing the position of the ring with flexible tabs of Figure 11 before a nut is screwed down over the ring; and Figure 16 is a side view, partly in cross section, of a slide bolt, a nut and the ring shown in Figure 12, taken at right angles to the view of Figure 15 and with the nut screwed partially over the flexible sections of the ring.

Referring particularly to Figures 1 and 2, a solid bolt is shown generally at 20, having a threaded portion or end 22 and a tapered portion or shank 24. A resilient ring 26 is positioned in a recess 28 substantially in the pivot plane of said bolt, that is, in the plane common to end 22 and shank 24.

The resilient ring may be of the open C-ring type and having, in its unrestrained shape, an outside diameter greater than the major diameter of the threads in end 22 and shank 24 so that in its unrestrained condition it extends beyond the surface of the bolt. The outside edges of the ring 26 may be generally rounded or beveled to present a surface adapted to respond to the bottom and inner surfaces of nut 40, as nut 40 forces the ring into recess 28 as the nut 40 is screwed down on shank 24. Recess 28 may be formed at the time of making the solid bolt or bolt part, or may be formed later by a cutting tool. The recess is of such depth and shape as to readily encompass ring 26 when ring 26 is forced into its contracted condition. In this condition ring 26 is wholly within the recess 28, its outer diameter being substantially the minor diameter of the threads on end 22 and shank 24. A first circumferential portion 24a of shank 24 extends at an angle to the pivot plane and an opposite second portion 24b extends at right angles from the pivot plane, to form the tapered shank 24. From the said second portion of shank 24, and at a distance from the pivot plane substantially equal to the combined thicknesses of plates 34 and 36, extends a flat-surfaced toe 38 adapted to engage the blind surface of plate 36. An undercut may be taken in shank 24, as at 39, so that when the said second portion of shank 24 is tight against the wall of the hole in the plate 36 and the rim of that hole is right-angled or sharp, the undercut prevents the edge of the hole in plate 36 from resting otherwise solely on the radius at the root of the toe 38, as it joins the shank 24, and thus prevents concentrating the forces of compression at the root of the toe 38 when tension is created by tightening-up on the nut 40.

The horizontal width of toe 38 is correlated to the degree of taper of the shank 24 such that the greatest diameter or distance in the shank in the plane of the flat surface of the toe is substantially equal to the diameter of the bolt in its pivot plane, which diameter is substantially the diameter of the holes in the materials to be secured together, with allowance for clearance. It will thus be seen that when the bolt 20 is positioned above and at an angle to the axis of the holes in plates 34 and 36, as shown in Figure 1, the greatest horizontal diameter of the bolt is substantially the diameter of the holes and the bolt may be inserted into holes of depths limited only by the length of the bolt itself.

As the bolt is inserted into the holes shown in Figure 1, and the ring 26 strikes the upper or exposed surface 33 of plate 34, the bolt 20 is prevented from passing through the holes and pivots about the first point of contact between ring 26 and plate 34 until the bolt is in the position of full contact between ring 26 and plate 34. In this position the toe 38 has moved laterally and is in position to engage the blind surface of plate 36. When nut 40 is screwed down the end 22, the lower side of nut 40 contacts the outer surface of ring 26 and forces it into recess 28. Upon further turning of the nut 40, it contacts the exposed surface of plate 34, drawing up the bolt 20 until toe 38 contacts the blind surface of plate 36. Further turning of the nut 40 places the bolt under tension and places the two plates under compression.

To remove the bolt 20, the nut is removed, the bolt is tilted at an angle to the axis of the holes until toe 38 clears the blind surface in plate 36, whereupon the bolt can be lifted out.

A socket 42 is formed in the upper end of end 22 in which a wrench may be applied to keep the bolt 20 from turning when the nut 40 is first being threaded on or being removed from end 22.

The spread bolt shown in Figures 3, 4, 9 and 10 is similar to the solid bolt, except that the bolt is made in two counterparts 20a and 20b, with their ends 22a and 22b, respectively, their shanks 24a and 24b, respectively, and their toes 38a and 38b, respectively. The two parts are held together by ring 26, seated in recess 28, to form a unit bolt. The cooperating flat surfaces of shanks 24a and 24b are parallel and in contact with each other when the bolt is in its collapsed condition (Figure 3), that is, when it is ready to be inserted into the holes of plates 34 and 36. In its collapsed condition, the greatest distance in the plane of the flat surfaces of toes 38a and 38b is substantially equal to the diameter of the holes. The bolt in its use is, therefore, independent of the depth of the holes and is limited in use only by the length of the bolt itself.

When the bolt is in its expanded condition, as shown in Figure 4, the flat surfaces of the shanks 24a and 24b, respectively, are spread apart so that the toes 38a and 38b, respectively, are in position to engage the blind surface of plate 36, and the flat surfaces of the ends 22a and 22b respectively, are parallel to and in contact with each other, permitting nut 40 to be screwed down along the ends, past the ring 26 as the ring is forced into the recess 28 and on down the threads on shanks 24a and 24b.

The two counterparts 20a and 20b are pivoted one on the other on a pivot such as a ball 44 shown in Figures 9 and 10. Other equally effective pivots, not shown, could be used, such as a detent made in one counterpart during forging operations and a corresponding protuberance forged on the other corresponding part, or a pin positioned in a hole bored in the bolt parallel to the flat sides of the counterparts, substantially in the pivot plane.

Referring to Figures 5, 6, 7 and 8, there is shown therein a slide bolt in which the flat surfaces of the two counterparts of the bolt are in contact with each other throughout their lengths and the two counterparts pivot on each other by the surfaces sliding one on the other, about an axis at right angles to their flat surfaces.

The counterparts consist of the threaded ends 22a and 22b, respectively, their tapered shanks 24a and 24b, respectively, and their toes 38a and 38b, respectively, which toes project laterally from their respective shanks. The two counterparts pivot on each other on ball 44 (Figures 7 and 8) or other types of pivots and may be moved to the collapsed condition of the bolt (Figure 5) ready to be inserted into holes in plates 34 and 36, or moved to the expanded condition (Figures 6 and 7), in which condition the toes are in a position to contact the lower surface of plate 36. When the nut 40 is screwed down beyond the resilient ring 26, which is in the pivot plane, the ring 26 is collapsed into recess 28 and the nut 40 may be screwed on down the threads on ends 22a and 22b.

In Figures 11 and 12 are illustrated two other types of rings that may be used as a substitute for the ring 26, shown in connection with Figures 1 to 10, inclusive. The ring shown in Figure 11 consists of a ring 46, which may be a C-ring or closed, having two flexible protuberances or tabs 48 extending therefrom, the outside diameter of the ring 46 being less than the root diameter of the threads of the bolt and the diameter of the ring 46 and tabs 48 in their unrestrained condition, being slightly greater than the major diameter of the said threads. When this type of ring is used (see Figure 15) the recess 28 also includes vertical recesses such as the detent shown at 50. The tip ends of tabs 48 in their unrestrained condition extend outward and downward and slightly beyond the surface of the bolt but extend only such a distance beyond the rim of the hole in plate 34 as to engage said rim and prevent the bolt from passing through said hole. However, the tabs do not extend outward in their unrestrained condition to such an extent that the upper sides of the tabs are out of engagement with the side walls of detents 50 and, therefore, ring 46 cannot rotate about its vertical axis. When the nut 40 is screwed down over the end 22, the tabs 48 will be forced inward into and occupy the detents 50. And, conversely, when the nut 40 is screwed up above the pivot plane or removed entirely, the tabs 48 will spring out and become effective again to keep the bolt from dropping through the holes in plates 34 and 36.

The ring shown in Figure 12 is made of a circle 52 of wire, which may be in the form of a C-ring or closed, with resilient sections 54 formed by bending the wire into V-shaped sections. These sections are forced in by the nut 40 (Figure 16) as the nut 40 is screwed down to contact exposed surface 33, the same as for the flexible tabs 48 shown in Figure 11, the upper parts of sections 54 engaging the side walls of detent 50, as at 55, whereby ring 52 is prevented from turning on its vertical axis as nut 40 is screwed down.

The ring 56 shown in Figures 13 and 14 consists of a helically wound section of a coil, the form of the outer part of the ring being of the same shape as the threads on ends 22 and 22a, and the coil being of such a diameter that the outside diameter of the ring 56 in its unrestrained condition is greater than the major diameter of the threads on the ends 22a and 22b. The ring 56 is adapted to fit into a recess 58 in the body of the bolt of a spiral shape corresponding to the shape of the inner surfaces of ring 56, when ring 56 is in its restrained condition, so that when the ring 56 is in its restrained condition in the recess 58, the outer diameter of the ring 56 does not extend beyond the surface of the bolt, the inner diameter of ring 56 is in contact with the surfaces of recess 58, and the outside surface of ring 56 forms a part of the threads of the bolt to engage the nut 40.

While the preferred embodiments of the invention have been illustrated and described by way of examples, it will be obvious that changes may be made therein within the spirit and scope of the invention, and, therefore, the invention is not to be limited to the precise forms herein disclosed.

It is apparent that the rings 26 and 56 and the rings 46 and 52 with their protuberances need not be resilient if the bolt is to be used under conditions where reuse is not probable or not desired. In such cases, the rings and protuberances may be made of some ductile material, such as a soft steel, brass or a plastic, that is stiff enough to prevent the bolt from passing through the bolt holes in the material to be secured together, but is deformable into the recesses 28 and detents 50. When a bolt with a non-resilient ring is used, the bolt may be removed in the same manner as when a resilient ring is used, except that care must be taken that the bolt does not slip through the bolt holes while it is in its expanded condition. Such a used bolt may be prepared for reuse by removing the deformed ring and applying a new deformable ring that is partially within the recesses and partially protruding beyond the outer surface of the bolt.

What I claim is:

1. A bolt for insertion through an opening in a member accessible from one side only, said bolt being divided longitudinally into a plurality of parts, one end of said parts being threaded to cooperatively receive an internally threaded member, a tapered shank extending axially from said threaded end, each of said shanks having a toe extending laterally therefrom and adapted to engage a surface on the opposite side of said first-mentioned member, a recess in the outer surface of each of said parts extending inwardly of the root diameter of the threads of said parts, resilient means mounted in said recesses for holding said parts assembled and for engaging said one side of said first-mentioned member prior to reception of said internally threaded member and for compression entirely within said recesses by said internally threaded member.

2. The bolt as claimed in claim 1 in which the resilient means is an open C-ring.

3. The bolt as claimed in claim 1 in which the resilient means is a helically wound section of a coil.

4. The bolt as claimed in claim 1 in which said parts are pivotally interconnected for movement of the shanks to and from each other.

5. A bolt for insertion through an opening in a member accessible from one side only, said bolt having two separable counterparts, each of said counterparts having a head end with a flat side and being threaded to cooperatively receive an internally threaded member, and having a tapered shank portion extending axially therefrom and a flat side at an angle to the flat side of its head portion and diverging from the flat side of the other shank portion, each of said shank portions having a toe extending laterally therefrom and adapted to engage a surface on the opposite side of said accessible member, a corresponding recess in the outer surface of each of said counterparts extending inwardly of the root diameter of the threads of said counterparts, resilient means mounted in said recesses for holding said counterparts assembled and for engaging said one side of said first-mentioned member prior to reception of said internally threaded member and for compression entirely within said recesses by said internally threaded member.

6. A bolt for insertion through an opening in a member accessible from one side only, said bolt having two separable counterparts, each of said counterparts having a head end with a flat side and threaded to cooperatively receive an internally threaded member, a tapered shank portion extending axially from its threaded head end, and a flat side lying in the plane of the flat side of said threaded head end, each of said shank portions having a toe extending laterally therefrom and adapted to engage a surface on the opposite side of said accessible member, a corresponding recess in the outer surface of each of said counterparts extending inwardly of the root diameter of the threads of said counterparts, resilient means mounted in said recesses for holding said counterparts assembled and for engaging said one side of said first-mentioned member prior to reception of said internally threaded member and for compression entirely within said recesses by said internally threaded member.

References Cited in the file of this patent

UNITED STATES PATENTS

| | | |
|---|---|---|
| 947,489 | Joseph | Jan. 25, 1910 |
| 1,055,330 | Kling | Mar. 11, 1913 |
| 1,572,770 | Colley | Feb. 9, 1926 |
| 1,887,448 | Behringer | Nov. 8, 1932 |
| 2,045,869 | Olsen et al. | June 30, 1936 |

FOREIGN PATENTS

| | | |
|---|---|---|
| 175,707 | Great Britain | Mar. 2, 1922 |